US012742879B2

(12) United States Patent
Manneschi

(10) Patent No.: US 12,742,879 B2
(45) Date of Patent: Sep. 22, 2026

(54) SECURITY BODY SCANNER EMPLOYING RADIANT ENERGY AND ASSOCIATED DETECTING METHOD

(71) Applicant: Alessandro Manneschi, Arezzo (IT)

(72) Inventor: Alessandro Manneschi, Arezzo (IT)

( * ) Notice: Subject to any disclaimer, the term of this patent is extended or adjusted under 35 U.S.C. 154(b) by 478 days.

(21) Appl. No.: 17/918,775

(22) PCT Filed: Apr. 14, 2021

(86) PCT No.: PCT/EP2021/059675

§ 371 (c)(1),
(2) Date: Oct. 13, 2022

(87) PCT Pub. No.: WO2021/209505

PCT Pub. Date: Oct. 21, 2021

(65) Prior Publication Data

US 2023/0131216 A1 Apr. 27, 2023

(30) Foreign Application Priority Data

Apr. 14, 2020 (FR) ...................................... 2003724

(51) Int. Cl.
*G01S 13/88* (2006.01)
*G01S 13/89* (2006.01)
*H04R 1/02* (2006.01)

(52) U.S. Cl.
CPC ............ *G01S 13/887* (2013.01); *G01S 13/89* (2013.01); *H04R 1/025* (2013.01)

(58) Field of Classification Search
CPC ........ G01S 13/887; G01S 13/89; H04R 1/025
See application file for complete search history.

(56) References Cited

U.S. PATENT DOCUMENTS 6,094,472 A 7/2000 Smith
10,261,177 B2 4/2019 Ahmed et al.
(Continued)

FOREIGN PATENT DOCUMENTS

CN 103892852 B 3/2016
CN 109471099 A 3/2019
(Continued)

OTHER PUBLICATIONS

Mowery et al. (Aug. 2014). Security analysis of a full-body scanner. https://cseweb.ucsd.edu/~kmowery/papers/secure-1000.pdf (Year: 2014).*

(Continued)

*Primary Examiner* — William Kelleher
*Assistant Examiner* — Hailey R Le
(74) *Attorney, Agent, or Firm* — Lerner David LLP

(57) ABSTRACT

The present invention relates to a method for detecting (S) a target object using a detector (I) employing radiant energy, comprising the following steps: SI: placing an individual to be inspected in a first position within the detector (I); S2: acquiring first signals representative of a radiant energy when the individual to be inspected is in the first position; S3: placing the individual to be inspected in a second position within the detector (I), the second position being different from the first position; and S4: acquiring second signals representative of a radiant energy when the individual to be inspected is in the second position: and S5: on the basis of the first signals and of the second signals, producing an electronic image so as to determine whether the individual to be inspected is carrying, wearing or bearing a target object.

19 Claims, 5 Drawing Sheets

(56) References Cited

U.S. PATENT DOCUMENTS

| | | | | |
|---|---|---|---|---|
| 2004/0090359 | A1* | 5/2004 | McMakin | G01S 13/89 342/44 |
| 2007/0030105 | A1 | 2/2007 | Manneschi et al. | |
| 2009/0116617 | A1 | 5/2009 | Mastronardi et al. | |
| 2010/0103019 | A1* | 4/2010 | Ammar | G01S 13/89 342/179 |
| 2010/0141502 | A1 | 6/2010 | Cardiasmenos et al. | |
| 2010/0161241 | A1* | 6/2010 | Manneschi | G01T 1/163 702/22 |
| 2011/0274250 | A1 | 11/2011 | Gray et al. | |
| 2011/0316995 | A1 | 12/2011 | Manneschi | |
| 2012/0105267 | A1* | 5/2012 | DeLia | G06V 10/36 378/70 |
| 2012/0307968 | A1 | 12/2012 | Smith | |
| 2013/0307714 | A1* | 11/2013 | Williams | G01V 8/005 342/176 |
| 2015/0323664 | A1 | 11/2015 | Wu et al. | |
| 2016/0047757 | A1 | 2/2016 | Kuznetsov et al. | |
| 2016/0216371 | A1* | 7/2016 | Ahmed | G01S 13/89 |
| 2019/0383934 | A1 | 12/2019 | Luukanen et al. | |
| 2020/0320814 | A1* | 10/2020 | Hastings | G01V 5/20 |

FOREIGN PATENT DOCUMENTS

| | | | |
|---|---|---|---|
| EP | 2202700 | B1 | 10/2012 |
| JP | 2010223603 | A | 10/2010 |
| JP | 2016191713 | A | 11/2016 |
| RU | 2371735 | C2 | 10/2009 |
| RU | 2512679 | C1 | 4/2014 |
| RU | 2523771 | C2 | 7/2014 |
| RU | 2622618 | C1 | 6/2017 |
| WO | 2005050160 | A2 | 6/2005 |
| WO | 2009082762 | A1 | 7/2009 |

OTHER PUBLICATIONS

French Preliminary Search Report for Application No. FR 2003724 dated Dec. 8, 2020, 2 pages. [See p. 1, categorizing the cited references].

International Search Report for Application No. PCT/EP2021/059675 mailed Jun. 30, 2021, pp. 1-3.

* cited by examiner

SECURITY BODY SCANNER EMPLOYING RADIANT ENERGY AND ASSOCIATED DETECTING METHOD

CROSS-REFERENCE TO RELATED APPLICATIONS

The present application is a national phase entry under 35 U.S.C. § 371 of International Application No. PCT/EP2021/059675 filed Apr. 14, 2021, which claims priority from French Application No. 2003724 filed on Apr. 14, 2020, all of which are incorporated herein by reference.

TECHNICAL FIELD

The present application relates to the field of detectors designed for the detection of unauthorized objects or materials in a protected access area.

The present application relates most particularly to the field of body scanners designed to inspect individuals, for example passengers before boarding, in airports, or else individuals accessing a public site, for example a sports arena such as a stadium or performance hall, in order to detect prohibited targets concealed under clothing. Such devices allow in particular to avoid systematic palpation.

BACKGROUND

It now appears necessary to control with great reliability the attempts to introduce or take prohibited products, in particular weapons or explosives, in or out of a sensitive area. The problem thus posed covers a very wide range of situations, which includes in particular and without limitation the attempt to introduce prohibited products into a protected area, such as an airport, a store, a school, a station, a public or else private body, or the attempt to take products outside a defined perimeter, for example in the event of theft in a company or on a protected site.

Different types of metal object detectors exist. In particular, continuous wave walk-through portals for the detection of metal objects have been proposed for many years, that is to say walk-through portals using waves of constant amplitude and frequency in frequency ranges comprised between 70 Hz and 50 kHz typically. They comprise at least one emitter coil and at least one receiver coil. The emitter coil is power supplied by alternating current. The receiver coil is designed to detect disturbances in the magnetic field generated by the emitter coil due to the presence of a metal object, for example the attenuation of the amplitude of the magnetic field, or else the change in phase of the signal, due for example to eddy currents generated on the metal object.

It has also been proposed to use body scanners. The oldest body scanners are X-ray body scanners. Newer body scanners use so-called millimeter wave (or micro-wave) technology. An example of a body scanner can be found in document EP 2 202 700.

For several years, body scanners have been developed in order to detect weapons, explosives, etc. hidden under the clothing of individuals entering a protected area. These scanners use technologies based on the detection of modulated radiation energies, reflected or emitted by the body of the individuals inspected. The radiation energies thus used comprise X-rays, micro-waves, millimeter waves, infrared light, terahertz waves and ultrasound.

Regardless of the type of radiant energy and imaging geometry, these body scanners all work on creating an electronic image of the individual on which the clothing of the individual is transparent. This image is then displayed on a screen and viewed by an operator so that the latter determines whether the individual is carrying a target object. For this purpose, the operator, who is trained in the detection of target objects, must be able to determine whether the objects identified by the body scanner correspond to human anatomy, an authorized object such as a lighter, a handkerchief or parts, or to a target object such as a weapon or explosive. Alternatively, in order to respect the privacy of the individuals inspected, the system may comprise software comprising code instructions to automatically analyze the image and determine the presence of any anomalies and display them on an avatar representing the individual.

It turns out nowadays that individuals who attempt to fraudulently introduce a prohibited object, in particular a weapon, into a protected area show great imagination in concealing said objects, for example separating the object into different parts that they spread over the body. Examination using body scanners therefore becomes increasingly complex and time-consuming if the target object has been concealed in such a way that it is difficult to reach by the radiation energy. In particular, it emerges from that the denser the scan of the front face and the rear face of the inspected individual, which ensures reliable detection by the body scanner, the more the scan of the lateral parts of the inspected individual is reduced. Indeed, the intensity of the energy reflected by these parts is very low and, due to their position in relation to the transducers, a large part of the waves are reflected outside the plane in which the emission and reception transducers are located. These reflected waves cannot therefore participate in the production of the electronic image. This risk is all the greater as the surface of the lateral part (that is to say the distance between its front face and its rear face) of the individual to be inspected is large.

In order to reduce this risk, it has been proposed to increase the sensitivity of the body scanner. However, such an increase in sensitivity is necessarily accompanied by an increase in false alarms, and therefore in palpations operated by security officers. In addition to drastically slowing down the duration of the inspection of the individual and therefore the efficiency of the inspection process, this palpation is often perceived as annoying by the individuals to be inspected.

It has also been proposed to add transducers specifically intended to scan these hidden areas in order to improve the radiation exposure of these areas. However, this implies a significant increase in the number of resources and in the cost of the system in comparison with the number of resources necessary to explore the front and rear faces of the body of the individual to be inspected, which are directly exposed to the radiation from the antennas. In addition, the increase in the number of transducers necessarily implies an increase in the duration of the processing of the signals coming from these transducers to obtain a significant response from the lateral parts of the individual to be inspected. This processing, in terms of resources used and scan time, is very inefficient in comparison with the imaging of the faces of the body which are parallel to the transducers (generally the front face and the rear face) which respond, on the contrary, with much higher intensity and in the same direction of the emitting and receiving transducers.

It has also been proposed to successively place several types of detectors, for example a metal detector and a body scanner. However, even if the existing metal detectors are the most efficient solution as regards the detection of the existence or not of a metal object, independently of their position in relation to the inspected individual, they cannot carry out the localization of a non-metal object on an individual. If a non-metallic target object is concealed in areas that are difficult to access by the body scanner, there is therefore always a risk that the target object will not be identified.

Finally, it has been proposed to produce a walk-through portal comprising detection means movable in rotation mounted in a cylindrical wall. The rotation of the detection means thus allows to scan circumferentially the individual to be inspected so as to obtain a complete image of this individual. However, it has a significant thickening on the ground, given its cylindrical shape, can be impressive for the individuals inspected, and the time for scanning and processing the information thus recorded can be long. In addition, the circumferential scan of the inspected individual cannot be complete since the system must provide two openings to allow the entry and exit of the individual to be inspected. In systems existing on the market, the total scan angle is at most 240 degrees, so that the individual is not inspected over 60 degrees in correspondence of the entry and over 60 degrees in correspondence of the exit.

SUMMARY

An object of the present disclosure is to propose a detecting method and detector associated with radiant energy for detecting target objects which overcomes the aforementioned disadvantages.

In particular, an object of the disclosure is to provide a detecting method and an associated detector employing radiant energy capable of more reliably detecting target objects carried by an individual, even when these targets are located in areas which are more difficult to explore by radiant energy, which allows to reduce the number of resources necessary for the implementation of the method while remaining fast, efficient and with a reduced rate of false alarms.

For this purpose provision is made, according to a first aspect, of a method for detecting a target object using a detector employing radiant energy, wherein the detector comprises two opposite side panels, said side panels being fixed and together delimiting a passage, the detecting method comprising the following steps:

- S1: placing an individual to be inspected in a first position within the passage between the side panels of the detector;
- S2: acquiring first signals representative of a radiant energy when the individual to be inspected is in the first position;
- S3: placing the individual to be inspected in a second position within the passage between the side panels of the detector, the second position being different from the first position; and
- S4: acquiring second signals representative of a radiant energy when the individual to be inspected is in the second position; and
- S5: on the basis of the first signals and the second signals, producing an electronic image so as to determine whether the individual to be inspected is carrying a target object.

Certain preferred but non-limiting features of the detecting method according to the first aspect are the following, taken individually or in combination:

- between the first position and the second position, the inspected individual rotates on himself at an angle which is different from 180°;
- between the first position and the second position, the inspected individual rotates a quarter turn;
- the method further comprises, prior to step S3, a step S6 of sending instructions to the inspected individual to move him from the first position to the second position;
- during step S6, the instructions are visual and/or audible;
- during step S1, the individual to be inspected is placed facing one of the side panels, and during step S3 the individual to be inspected is placed perpendicular to the side panels;
- during step S1 and/or S3, the inspected individual places his arms at a distance from his body;
- the method further comprises a step of processing by a central unit the first signals and the second signals so as to detect a target object carried by the individual to be inspected;
- the first signals are transmitted to the central unit prior to step S4;
- the first signals are processed during all or part of steps S3 and S4; and/or
- the central unit combines the first signals and the second signals so as to generate a single electronic image of the individual to be inspected.

According to a second aspect, it is proposed a detector employing radiant energy comprising:

- two opposite side panels fixed relative to each other and together delimiting a passage;
- radiant energy transducers, for example micro-wave antennas, housed in at least one of the side panels; and
- a central unit configured to implement a detecting method according to the first aspect.

Certain preferred but non-limiting features of the detector according to the second aspect are the following, taken individually or in combination:

- the detector further comprises a visual and/or audible indicator, the central unit being configured to send instructions to the visual and/or audible indicator to move an individual to be inspected from the first position to the second position;
- the visual indicator comprises at least one of the following means: one or more lights placed in a platform extending between the side panels; a projector configured to project one or more images onto the platform and/or onto at least one side panel; a loudspeaker configured to emit an audible message for the attention of the individual to be inspected; and/or
- the side panels each have an internal face facing the opposite side panel, said internal faces being curved.

DESCRIPTION OF THE FIGURES

Other features, objects and advantages of the invention will emerge from the description which follows, which is purely illustrative and not limiting, and which must be read in conjunction with the appended drawings wherein.

In all the figures, similar elements bear identical references.

DETAILED DESCRIPTION

Figure 1:
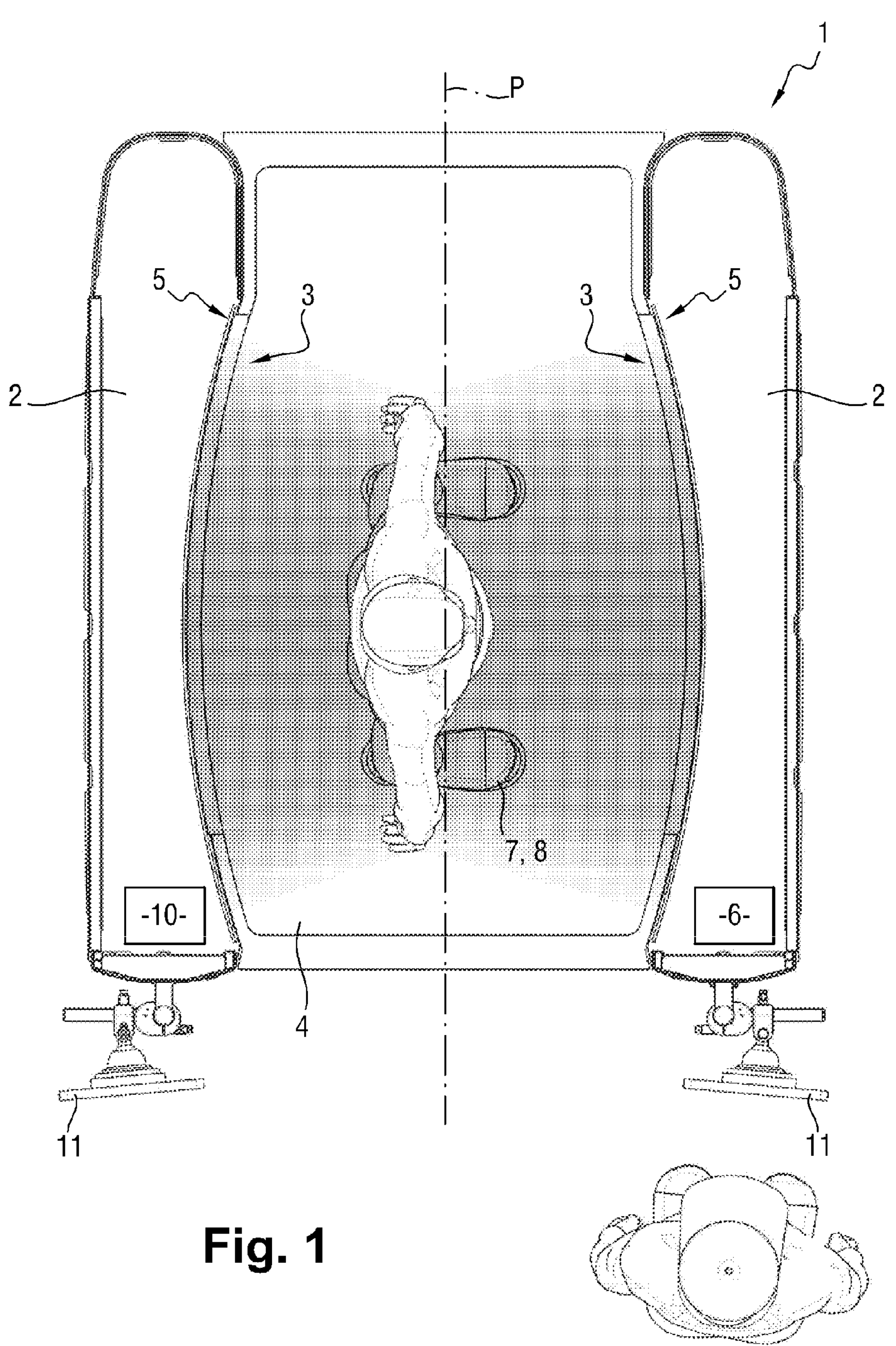
FIG. 1 schematically illustrates a detector according to a first embodiment. In this figure, the individual to be inspected is placed in a first position and the surfaces of the individual likely to be explored by radiation transducers have been shown schematically.

A radiant energy target object detector 1 comprises two opposite side panels 2 which are fixed and together delimit a passage forming a transit channel for an individual to be inspected. The side panels 2 are substantially symmetrical with respect to a central plane P (fictitious plane of symmetry). In one embodiment, the side panels 2 are connected at their upper edge by a ceiling and/or at their lower edge by a platform 4 so as to be integral. Alternatively, the side panels 2 can be separate and distinct, that is to say not connected via a ceiling or a platform 4.

Each side panel 2 has an internal face 3, oriented towards the passage. More specifically, the internal face 3 of the first side panel 2 faces the internal face 3 of the second side panel 2 so as to delimit the passage laterally.

The detector 1 further comprises a series of radiant energy emitter/receiver transducers 5 and a central unit 6 configured to receive signals representative of the radiant energy reflected and measured by the transducers 5 and to deduce an electronic image therefrom.

The transducers 5 are disposed at the internal face 3 of at least one of the side panels 2, preferably of each side panel 2. Each transducer can successively form an emitter configured to generate radiant energy and a receiver configured to receive a radiant energy.

In one embodiment, each transducer comprises an antenna 5 configured to generate radiant energy of the millimeter wave type (also called micro-wave), X-ray, terahertz wave, etc.

In what follows, the detector will be more particularly described in the case where the transducers 5 comprise micro-wave antennas 5, that is to say antennas 5 configured to generate waves whose length is comprised between 3 mm and 20 mm included (that is to say a frequency range from approximately 15 GHz to 100 GHz), without this being limiting. Micro-waves are indeed suitable for the detection of metal and non-metal objects, such as ceramic objects. Also, air and other materials, such as those used for clothing, are transparent to this radiation. It follows that micro-waves can be used for the detection of objects concealed under clothing. In order to detect target objects, the micro-wave antennas 5, as emitters, generate pulses or micro-wave frequency scan. The energy reflected from each part of the individual is then measured by the micro-wave antennas 5, as receivers, which then transmit to the central unit 6 a signal representative of this reflected energy which analyzes it to generate an electronic image of the inspected individual, on which his clothes are essentially transparent. If necessary, the detector 1 further comprises a network interface configured to receive the signals representative of the reflected energy and to transmit them to the central unit 6.

The central unit 6 may in particular comprise a computer of the processor, microprocessor, microcontroller, type, etc., configured to execute code instructions with a view to processing the signals representative of the radiant energy reflected and measured by the transducers 5 and to deduce therefrom the electronic image.

Figure 5:
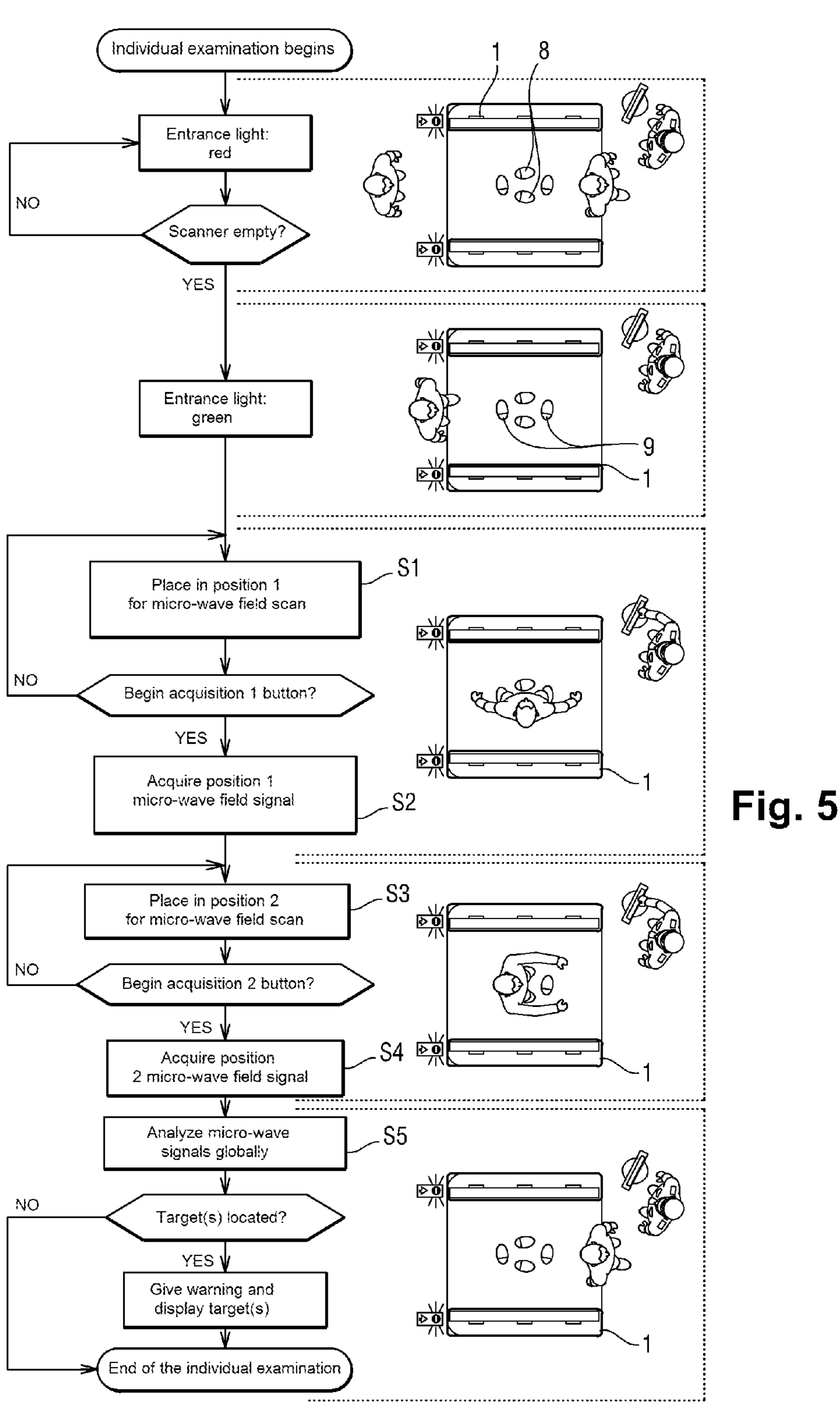
FIG. 5 is a flowchart illustrating steps of a detecting method according to one embodiment, in which an example of a detector according to the invention and the position of an inspected individual have been illustrated in sectional view.

Optionally, the detector 1 further comprises presence detection means, for example an optical barrier placed at the entrance of the detector 1. If necessary, the detector 1 further comprises signaling, which can be placed at the entrance of the detector 1 and synchronized with the presence detection means, in order to indicate to the inspected individual whether he can enter the detector 1. The signaling can for example be of the green light/red light type (see FIG. 5).

In order to improve the detection of target objects, the inspection of an individual is carried out according to the following steps:

- S1: placing an individual to be inspected in a first position within the passage between the side panels 2 of the detector 1;
- S2: acquiring first signals representative of a radiant energy when the individual to be inspected is in the first position;
- S3: placing the individual to be inspected in a second position within the passage between the side panels 2 of the detector 1, the second position being different from the first position; and
- S4: acquiring second signals representative of a radiant energy when the individual to be inspected is in the second position; and
- S5: on the basis of the first signals and the second signals, producing an electronic image so as to detect a target object carried by the individual to be inspected.

More specifically, during step S1, the inspected individual is placed in the detector 1, between the side panels 2, in a first position.

This first position can be conventional and correspond for example to a position in which the individual to be inspected is placed facing one of the side panels 2, globally in the central plane P, the legs apart substantially parallel to this central plane P. The individual can leave his arms along the body or alternatively spread them, in the central plane P. This first position has been illustrated in FIG. 1.

In this first position, the antennas 5 are therefore capable of generating micro-waves scanning the front face (respectively, the rear face) of the inspected individual, so that the first electronic image obtained represents the front face (respectively, the rear face) of the individual to be inspected.

During step S2, all or part of the micro-wave antennas 5 housed in the first side panel 2 and/or the second side panel 2 generate and emit pulses or trains of micro-waves in the direction of the passage. These micro-waves interact with the facing surface, namely the body of the individual to be inspected, his clothing and any object possibly concealed by this individual under his clothing as well as the internal face 3 of the facing side panel 2. This interaction modulates the energy of the micro-waves which, once reflected, return to the antenna(s) 5, which act as a receiver.

The energy reflected from each part of the individual to be inspected is measured by the antennas 5, as receivers. Each antenna 5 then transmits to the central unit 6 a first signal representative of this reflected energy (steps 2.1 and S4.1) with a view to processing it and producing the electronic image of the individual to be inspected (step S5). If necessary, this transmission can be carried out via a network interface.

During step S3, the individual is placed in a second position, distinct from the first position. In one embodiment, the individual to be inspected rotates on himself between the first position and the second position, the objective being to position a different surface of the body facing the side panels 2. The angle of rotation between the first position and the second position is therefore different from 180°, in particular when the two side panels 2 house micro-wave antennas 5 (the antennas 5 of one of the panels allowing to generate an electronic image of the front face of the individual and the antennas 5 of the other of the panels allowing to generate an electronic image of the rear face of the individual).

In one embodiment, the individual to be inspected makes a quarter turn to switch from the first position to the second position, so that the angle between the first position and the second position is equal to approximately 90° (at within 20 degrees) (modulo 180°). Advantageously, when the second position is substantially perpendicular to the first position, the side surfaces of the individual to be inspected, which were perpendicular to the internal faces 3 of the side panels 2 during the acquisition step S2, are facing the side panels 2 during the acquisition step S4. This therefore improves the capacity of the micro-wave antennas 5 to explore the side faces of the individual to be inspected and increases the intensity of the energy reflected by these side faces in step S4, in comparison with the energy reflected by these same parts during step S2. It follows that the number of resources (micro-wave antennas 5) necessary to improve detection in these areas can be reduced, as can the duration of processing the first signals and the second signals.

In order to improve the exploration of their lateral faces in the second position, the individual can raise their arms so as to place them in front of them or on the sides, at shoulder height, approximately parallel to the ground. In this second position, with the arms raised, the antennas 5 are therefore capable of scanning the entire right side face (respectively, the left side face) of the inspected individual, so that the second electronic image obtained represents the right side face (respectively, the left side face) of the individual to be inspected.

Step S4 is basically identical to step S2, except for the position of the individual to be inspected (placed in the second position rather than the first position). Thus, at the end of this step, each antenna 5 transmits to the central unit 6 a second signal representative of the energy reflected by the individual inspected in the second position with a view to its processing by the central unit 6 and making the electronic image. If necessary, this transmission can be carried out via a network interface.

Step S4 can be initiated automatically by the central unit 6. For example, the detector 1 can comprise detection means (photovoltaic barriers, presence detection, etc.) placed in the ground or in the side panels 2 configured to determine if the individual to be inspected is in the second position. Alternatively, step S4 can be initiated manually by a security officer, for example by pressing an acquisition button, when the individual is placed correctly in the second position.

In one embodiment, the method further comprises a step S6 during which the central unit 6 sends instructions to one or more indicators 7 configured to guide the inspected individual and place him in the first position and/or in the second position. These indicators can for example be visual and/or audible. The central unit 6 thus allows to coordinate the placement steps S1 and S3 with the acquisition steps S2 and S4.

In a first embodiment, the indicator 7 comprises one or more lights placed in the platform 4 of the detector 1 and configured to receive instructions for turning the central unit 6 on and off.

Figure 2:
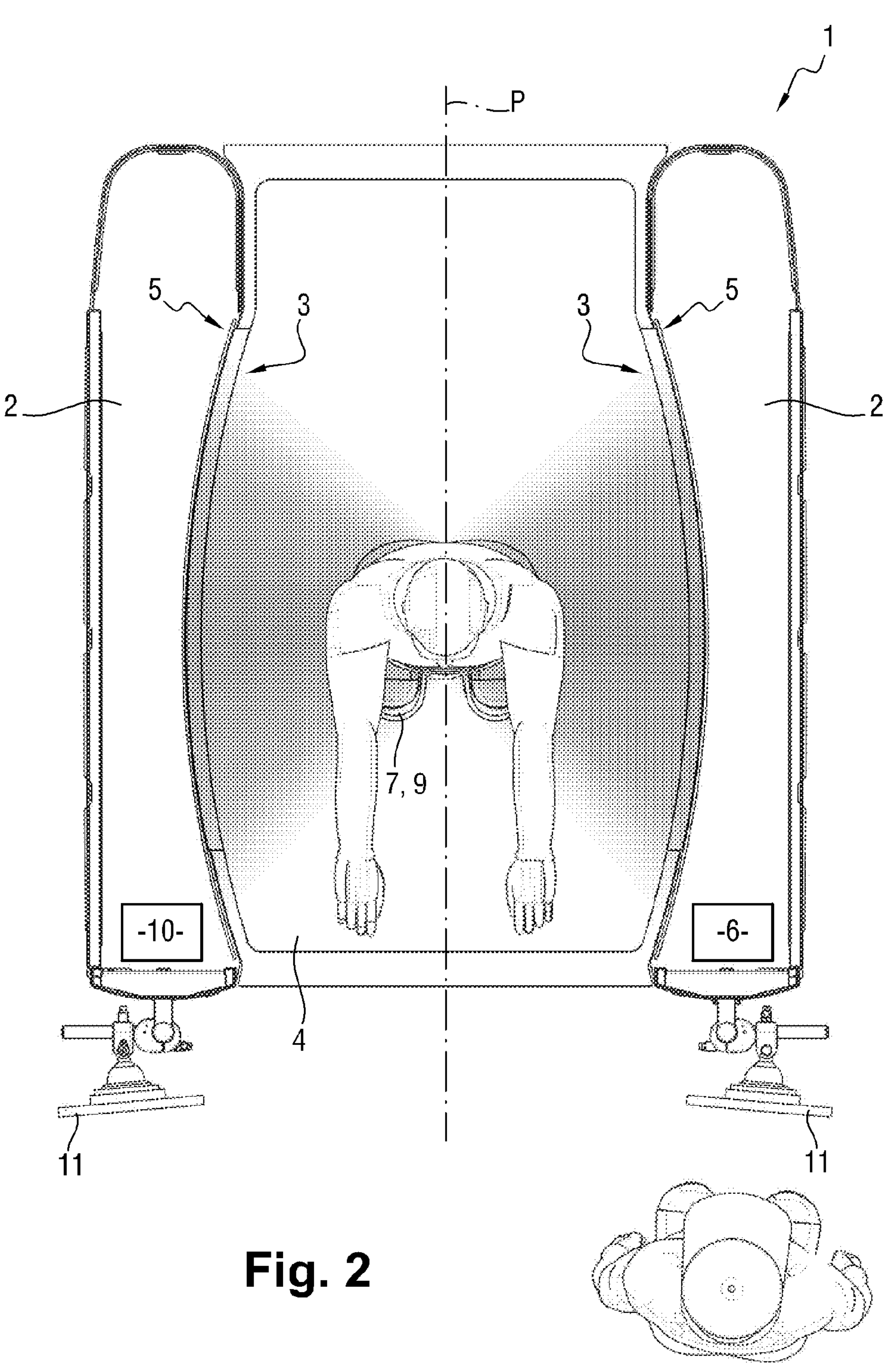
FIG. 2 schematically illustrates the detector of FIG. 1, when the individual to be inspected is placed in a second position. The surfaces of the individual likely to be explored in this second position by radiation transducers have been shown schematically.
Figure 3:
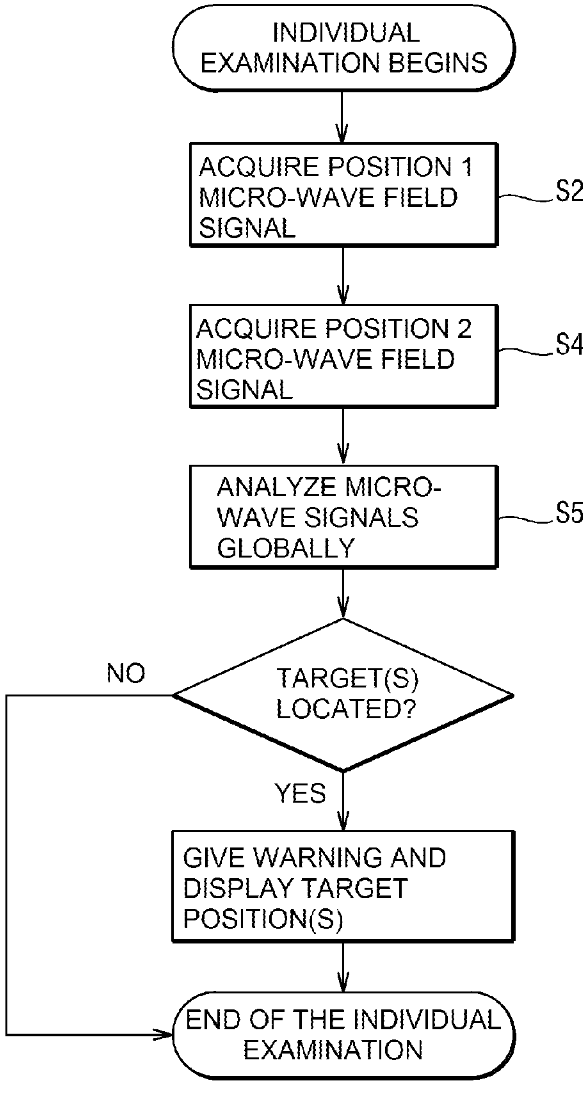
FIGS. 3 and 4 are flow charts of steps of a detecting method according to one embodiment.

For example, as illustrated in FIGS. 1 and 2, the detector 1 may comprise a series of light-emitting diodes (LEDs) 7, positioned so as to form two sets of shoe prints, a first set 8 corresponding to the position of the feet of the individual to be inspected in the first position (for example facing one of the side panels 2), in the central plane P, the second set 9 corresponding to the position of the feet of the individual to be inspected in the second position (for example perpendicular to the side panels 2 and to the central plane P). When the individual to be inspected enters the detector 1 and/or during step S1, the LEDs forming the first set 8 of shoe prints are lit in order to guide the individual to be inspected and to help him to position himself correctly in the first position within the detector 1, with a view to acquiring the first electronic image during phase S2. Following step S2, these LEDs are off. In order to guarantee that the individual to be inspected is placed correctly in the second position in step S3, the LEDs forming the second set 9 of shoe prints are lit between the moment when the LEDs forming the first set 8 of shoe prints are unlit and step S3 begins. In this way, the individual to be inspected is encouraged to rotate on himself to place his feet in the second set 9 of shoe prints and thus position himself in the second position. Finally, the LEDs forming the second set 9 of shoe prints are unlit before step S5, for example at the end of step S4.

Of course, it will be understood that, in a variant embodiment, the first set 8 of shoe prints and the second set 9 of shoe prints can remain lit simultaneously throughout the detection method (as shown for example in FIG. 5), the individual to be inspected being invited to position his feet in either set by oral indications formulated by a security officer or broadcast by a loudspeaker.

In a second embodiment, the indicator 7 of the detector 1 comprises a projector configured to project one or more images onto the internal face 3 of one of the side panels 2 and/or onto the platform 4. The image(s) projected onto the internal face 3 may in particular have the function of providing information as to the sequence of positions as well as their sequence during the implementation of the detecting method. The images projected onto the platform 4 can correspond to a first set 8 of shoe prints and a second set 9 of shoe prints, the successive steps of projection of which onto the platform 4 correspond to the steps of turning on and off the LEDs forming the first and second set 9*x* of shoe prints described in the first embodiment.

In a third embodiment, the indicator 7 of the detector 1 is audible and comprises a loudspeaker 10, which can be fixed directly to the detector 1 or be placed at a distance therefrom. The loudspeaker 10 is then configured to emit an audible message for the attention of the individual to be inspected. For example, when the individual to be inspected enters the detector 1 and/or during step S1, the loudspeaker 10 emits a sound message to guide the individual to be inspected and help him to position himself correctly in the first position within the detector 1, with a view to acquiring the first electronic image during phase S2. In order to guarantee that the individual to be inspected is placed correctly in the second position, the loudspeaker 10 emits an audible message following step S2 to invite the individual to be inspected to rotate on himself, for example by a quarter turn, and position himself in the second position. Optionally, after step S4, the loudspeaker can emit an audible message to invite the individual to leave the detector 1.

Alternatively, the instructions are transmitted orally to the individual to be inspected by a security officer, who directly asks the individual to be inspected to move from the first position to the second position.

It will be understood that the first, second and third embodiments of the indicator 7 can be combined (combination of a loudspeaker 10 or oral instructions with lights 8, 9 and/or a projector).

During step S5, the central unit 6 processes the first signals and the second signals representative of the reflected radiant energy and produces one or more electronic images.

Typically, the central unit 6 can produce one or more first electronic image(s) and one or more second electronic image(s) (when each side panel 2 comprises micro-wave antennas 5 alternately playing the role of emitter and receiver) based on the first and second signals generated by the antennas 5 of each side panel 2 in steps S1 and S3, respectively.

Alternatively, and as will be seen below, the central unit 6 can be configured to produce a single electronic image based on the first and second signals. This single electronic image can be of the "elliptical" or "developed" type and reproduce the surface of the individual to be inspected over 360° (in particular when each side panel 2 comprises micro-wave antennas 5).

In order to improve the efficiency and speed of the detecting method, in one embodiment, during a step S2.1 prior to step S4, the first signals are transmitted to the central unit 6. Preferably, these first signals are transmitted by the micro-wave antennas 5 as soon as they are acquired.

Figure 4:
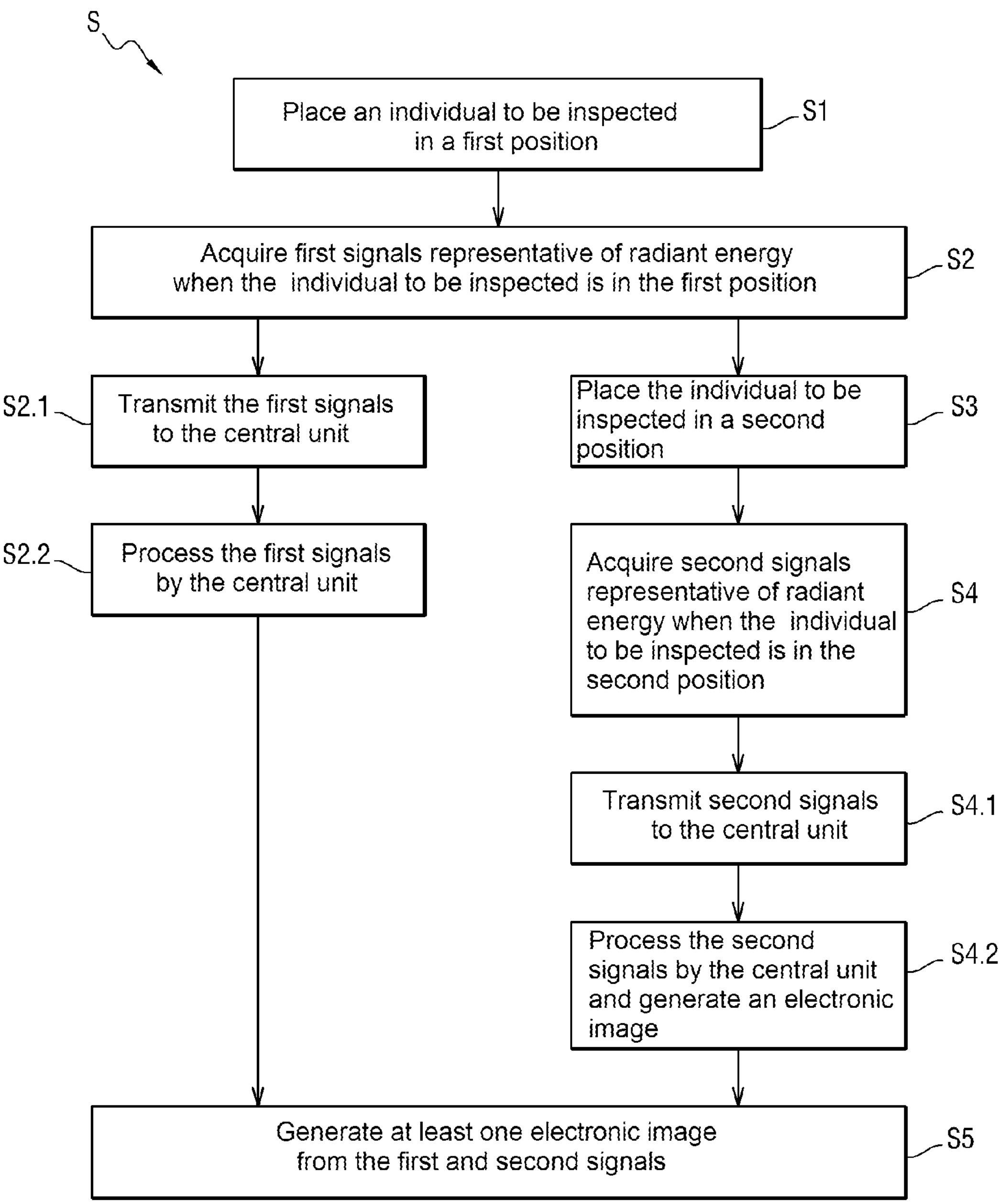

In addition, and still to reduce the total duration of the detection method, the central unit 6 processes the first signals as soon as they are received (step S2.2). More specifically, the central unit 6 processes the first signals before receiving the second signals (see FIG. 4). Thus, the central unit 6 begins the processing of the first signals during the passage of the individual to be inspected from the first position to the second position and, if necessary, during the acquisition of the second signals. In this way, when the central unit 6 receives the second signals, the first signals are already processed in whole or in part (depending on the processing time of the first signals and the time for performing the steps S3 and S4), which allows it to immediately start the processing of the second signals. The results of the processing of the first and of the second signals are therefore faster.

By way of non-limiting example, it should be noted that:

- the acquisition (step S2) of the first and second signals can typically last between 0.05 seconds and 0.5 seconds;
- the transmission (steps S2.1 and S4.1) of the first signals and of the second signals from the micro-wave antennas 5 to the central unit 6 can typically last between 0.05 seconds and 0.5 seconds;
- the processing (steps S2.2 and S4.2) of the first signals and of the second signals can last between two seconds and four seconds.

The transmission and processing (steps S2.1 and S2.2) of the first signals before and/or simultaneously with the transmission (step S4.1) of the second signals therefore reduces the total duration of the detecting method S by two to six seconds. It follows that, by the time the inspected individual leaves the detector 1, the security officer already has the result of the processing of the signals by the central unit 6. It is therefore not necessary to make the inspected individual wait. In addition, the detector 1 becomes immediately available for the inspection of a new individual to be inspected as soon as the individual who has just been inspected by the detector 1 leaves.

The detecting method S of the invention is therefore more efficient, since it is capable of reliably inspecting all the parts of the body of an individual to be inspected, without requiring an increase in the sensitivity of the detector 1 or the duration of the detecting method S.

Optionally, the detector 1 further comprises a screen 11 configured to display an electronic image generated by the central unit 6. The screen 11 can be mounted on the detector 1, for example on one of the side panels 2 at the exit of the detector 1, or alternatively placed remotely and communicate via a wireless or wired interface with the central unit. Alternatively, a screen 11 can be mounted on each side panel 2.

In an embodiment illustrated in FIGS. 1 and 2, in order to increase the detection efficiency and in particular the ability to explore the individual inspected by the detector 1, the internal face 3 of the panels can be curved, the center of the curvature being placed opposite the internal face 3. More specifically, in this embodiment, the curvature of the internal faces 3 of the side panels 2 is such that the distance between the internal faces 3 in a plane perpendicular to the central plane P gradually increases from the entrance of the detector 1 to a maximum distance, then gradually decreases in the direction of the exit of the detector 1. Alternatively, the internal faces 3 can be planar in pieces, the sections together forming a diverging then converging channel, from the entry to the exit. For this purpose, the internal faces 3 can for example each successively comprise at least one flat section inclined with respect to the central plane P so that the passage diverges (with respect to the direction of passage in the detector 1, that is to say from the entrance to the exit of the passage), then a flat section substantially parallel to the central plane P and at least one section inclined with respect to the central plane P so that the passage converges towards the exit.

As emerges from the figures, the surface of the inspected individual likely to be reached by the micro-waves is greater when the internal face 3 of the side walls is curved (continuously or in pieces), which further increases the reliability of detection.

In a first embodiment, the central unit 6 produces a single electronic image on the basis of the first signals and the second signals (step S5). The single electronic image therefore reproduces all the information obtained by the central unit 6 based on the first signals and the second signals. When these first and second signals are generated by micro-wave antennas 5 present in the two side panels 2, the single electronic image is a representation of the elements identified by the detector 1 over the entire circumference (360°) of the inspected individual and comprises therefore the front face, the rear face and the side faces of the inspected individual. The security officer therefore has, in a single image, all the information necessary to inspect the individual.

This single electronic image can be of the elliptical type (in three dimensions) or developed (in two dimensions).

In a second embodiment, the central unit 6 produces one or more first electronic images on the basis of the first signals (one per side panel 2 comprising micro-wave antennas 5) and one or more second electronic images on the basis of the second signals (one per side panel 2 comprising micro-wave antennas 5) (step S5). These electronic images can be displayed successively on the screen, or alternatively merged to obtain a single electronic image which will be displayed on the screen.

When a target is identified by the central unit 6, said target is displayed in the electronic image and an (audible and/or visual) alarm can be generated by the detector 1.

Alternatively, in order to respect the privacy of the individuals inspected, the system may include software comprising code instructions to automatically analyze the image and determine the presence of any anomalies and display them on an avatar representing the individual.

The invention claimed is:

1. A detection method for detecting a target object using a detector employing radiant energy, the detecting method comprising the following steps:

S1: placing an individual to be inspected in a first position within a passage between two side panels of a detector, wherein the side panels are symmetrical with respect to a central plane of symmetry of the detector;

S2: acquiring first signals representative of a radiant energy when the individual to be inspected is in the first position;

S3: placing the individual to be inspected in a second position within the passage between the two side panels of the detector, wherein in one of the first and second positions, the individual to be inspected is placed facing one of the side panels and leaves his arms along his body or spreads his arms in the central plane, and in another of the first and second positions, the individual to be inspected is placed perpendicular to the two side panels and moves his arms at a distance from his body so as to place them in front of him or on the sides, at shoulder height;

S4: acquiring second signals representative of a radiant energy when the individual to be inspected is in the second position; and S5: on the basis of the first signals and the second signals, producing an electronic image so as to investigate whether the individual to be inspected is carrying a target object.

2. The detection method according to claim 1, further comprising, prior to step S3, a step of sending instructions to the individual to be inspected to make the individual to be inspected move from the first position to the second position.

3. The detection method according to claim 2, wherein the instructions comprise at least one of visual instructions and audible instructions.

4. The detection method according to claim 2, wherein the instructions are sent by a central processing unit of the detector.

5. The detection method of claim 2, wherein the individual to be inspected is instructed orally by an operator or by audible instructions from the detector.

6. The detection method according to claim 1, further comprising a step of processing by a central processing unit the first signals and the second signals so as to detect a target object carried by the individual to be inspected.

7. The detection method according to claim 6, wherein the first signals are transmitted to the central processing unit prior to step S4.

8. The detection method according to claim 7, wherein the first signals are processed during all or part of steps S3 and S4.

9. The detection method according to claim 6, further comprising a step wherein the central processing unit combines the first signals and the second signals so as to generate a single electronic image of the individual to be inspected.

10. The detection method of claim 1, wherein acquisition of signals representative of a radiant energy is only performed during steps S1 and S3, and no acquisition is performed during movement of the individual to be inspected between the first position and the second position.

11. A detector comprising:

two opposite side panels fixed relative to each other and together delimiting a passage;

radiant energy transducers housed in at least one of the side panels; and a central processing unit configured to send instructions to an individual to be inspected placed in the passage so as to:

place the individual to be inspected in a first position within the passage between the two side panels of the detector;

acquire first signals representative of a radiant energy when the individual to be inspected is in the first position;

place the individual to be inspected in a second position within the passage between the two side panels of the detector, wherein in one of the first and second positions, the individual to be inspected is placed facing one of the side panels and leaves his arms along his body or spreads his arms in the central plane, and in another of the first and second positions, the individual to be inspected is placed perpendicular to the two side panels and moves his arms at a distance from his body so as to place them in front of him or on the sides, at shoulder height;

acquire second signals representative of a radiant energy when the individual to be inspected is in the second position; and on the basis of the first signals and the second signals, produce an electronic image so as to investigate whether the individual to be inspected is carrying a target object.

12. The detector according to claim 11, further comprising at least one of a visual indicator and an audible indicator, the central processing unit being configured to send instructions to the at least one of the visual indicator and the audible indicator to instruct an individual to be inspected move from the first position to the second position.

13. The detector according to claim 12, wherein the at least one of the visual indicator and the audible indicator comprises at least one of the following indicators:

one or more lights placed in a platform extending between the side panels;

a projector configured to project one or more images onto the platform and/or onto at least one side panel; and a loudspeaker configured to emit an audible message for the attention of the individual to be inspected.

14. The detector according to claim 11, wherein the side panels each have an internal face facing the opposite side panel, said internal faces being curved.

15. The detector according to claim 11, wherein the radiant energy transducers include microwave antennas.

16. The detector according to claim 11, wherein the two side panels are symmetrical with respect to a central plane of symmetry of the detector.

17. The detector according to claim 16, wherein, in one of the first and second positions, legs of the individual to be inspected are substantially parallel to the central plane, and in the other of the first and second positions, legs of the individual to be inspected are substantially perpendicular to the central plane.

18. The detector of claim 11, further comprising a platform configured to receive an individual to be inspected, the platform and the panels being fixed with respect to each other.

19. The detector of claim 11, wherein the central processing unit is configured to produce the electronic image on the basis of the first signals and the second signals only, without signals acquired during movement of the individual to be inspected between the first position and the second position.

* * * * *